US010113015B2

(12) United States Patent
Dall'Occo et al.

(10) Patent No.: US 10,113,015 B2
(45) Date of Patent: Oct. 30, 2018

(54) CATALYST FOR THE POLYMERIZATION OF OLEFINS

(71) Applicant: BASELL POLIOLEFINE ITALIA S.R.L., Milan (IT)

(72) Inventors: Tiziano Dall'Occo, Ferrara (IT); Dario Liguori, Ferrara (IT); Giampiero Morini, Ferrara (IT); Gianni Vitale, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 233 days.

(21) Appl. No.: 15/106,766

(22) PCT Filed: Dec. 15, 2014

(86) PCT No.: PCT/EP2014/077686
§ 371 (c)(1),
(2) Date: Jun. 20, 2016

(87) PCT Pub. No.: WO2015/091320
PCT Pub. Date: Jun. 25, 2015

(65) Prior Publication Data
US 2017/0002114 A1 Jan. 5, 2017

(30) Foreign Application Priority Data

Dec. 20, 2013 (EP) .................... 13198842

(51) Int. Cl.
C08F 4/16 (2006.01)
C08F 10/02 (2006.01)
C08F 10/00 (2006.01)

(52) U.S. Cl.
CPC .............. C08F 10/02 (2013.01); C08F 10/00 (2013.01)

(58) Field of Classification Search
CPC ..................... C08F 4/16; C08F 4/06
See application file for complete search history.

(56) References Cited

U.S. PATENT DOCUMENTS

| 5,055,535 A | 10/1991 | Spitz et al. |
| 5,990,251 A | 11/1999 | Gelus |
| 6,228,957 B1 | 5/2001 | Ford et al. |
| 2010/0331504 A1 | 12/2010 | Fushimi |
| 2011/0077368 A1 | 3/2011 | Fushimi et al. |

FOREIGN PATENT DOCUMENTS

| CN | 1268520 A | 10/2000 |
| CN | 101235110 A | 8/2008 |
| CN | 101939342 A | 1/2011 |
| CN | 102066428 A | 5/2011 |
| EP | 703246 A1 | 3/1996 |
| WO | WO-2009-150111 | 12/2009 |

OTHER PUBLICATIONS

Machine translation of CN 101235110. (Year: 2008).*
PCT International Search Report and Written Opinion dated Jan. 29, 2015 (dated Jan. 29, 2015) for Corresponding PCT/EP2014/077681.
Databse CA [Online] Chemical Abstracts Service, Columbus, Ohio, US; He, Shuyan et al: "Preparation of Catalyst Composition for Ethylene Gas-Phase", XP002722359, Retrieved From STN Database Acession No. 2008: 964997 Abstract.
Database CA [Online] Chemical Abstracts Service, Columbus, Ohio, US; Razuvaev, G.A.: "Catalytic Polymerization of Propylene Upon Treatment With Titanium Compounds", XP002722357, Retrieved From STN Database Accession No. 1961:115169 Abstract.
Database CA [Online] Chemical Abstracts Service, Columbus, Ohio, US; Razuvaev, G.A. et al: "Effect of Polar Additives on Stereospecific Polymerization of Propylene", XP002722358 Retrieved From STN Database Accession No. 1960: 106686 Abstract.

* cited by examiner

Primary Examiner — Wenwen Cai

(57) ABSTRACT

The present disclosure relates to catalyst systems for the polymerization of olefins of the general formula $CH_2=CHR$ that show improved polymerization activity, wherein R is an alkyl, cycloalkyl or aryl radical having 1-12 carbon atoms, comprising (A) a solid catalyst component comprising Ti, Mg, and halogen, (B) an aluminum alkyl compound, and (C) a halogenated cyclic ether compound.

5 Claims, No Drawings

CATALYST FOR THE POLYMERIZATION OF OLEFINS

FIELD OF THE INVENTION

This application is the U.S. National Phase of PCT International Application PCT/EP2014/077686, filed Dec. 15, 2014, claiming benefit of priority to European Patent Application No. 13198842.0, filed Dec. 20, 2013, the contents of which are incorporated herein by reference in its entirety.

The present disclosure relates to catalysts for the polymerization of olefins, including ethylene and its mixtures with olefins of the general formula CH2=CHR, wherein R is an alkyl, cycloalkyl or aryl radical having 1-12 carbon atoms, comprising a solid catalyst component comprising Ti, Mg, halogen and optionally an electron donor, an aluminum alkyl compound and halogenated cyclic ethers as activity enhancers. The catalysts of the disclosure may be used in any olefin polymerization process to prepare olefin homopolymers or copolymers.

BACKGROUND OF THE INVENTION

The polymerization activity of a catalyst is a very important factor in any polymerization process. For a given catalyst system, the activity may depend on the polymerization conditions, such as temperature and pressure. However, once the polymerization conditions are set the activity depends strictly on the catalyst system. If the activity is not satisfactory, the amount of catalyst fed to the reactor and/or the residence time of the catalyst may be increased. However, this solution adversely affects plant operability from an economic standpoint, as an increase in catalyst feed means increased cost per unity of polymer produced, while increased residence time means lower productivity for the plant.

Ziegler-Natta catalyst systems are generally obtained by reacting an aluminum alkyl compound with a solid catalyst component comprising a magnesium halide and a titanium compound containing at least a Ti-halogen bond. As the catalyst component is responsible for both the activity and the polymer properties, once the catalyst system has been chosen for industrial production it may be exchanged for a different catalyst system having higher activity if the new system is capable of producing the desired polymer properties.

In ethylene polymerization processes, attempts to increase catalytic activity have previously been reported, including processes using of halogenated hydrocarbon compounds as activity enhancers as disclosed, for example, in U.S. Pat. Nos. 5,863,995, and 5,990,251. However, halogenated alkyls often demonstrate criticality when a given threshold amount is used, thereby generating a decrease in catalyst activity. In WIPO Pat. App. No. WO 2009/150111, halogenated alkyl compounds in which the halogens are linked to secondary carbon atoms are described that produce results similar to or better than the corresponding halogenated alkyls in which the halogen is linked to a primary hydrocarbon.

In some cases, the catalysts systems may contain an external donor added as a modifier of the polymer properties. For instance, U.S. Pat. No. 5,055,535 describes linear or cyclic monoethers used as external donors that narrow the molecular weight distribution and reduce catalyst activity.

SUMMARY OF THE INVENTION

The present disclosure relates to a catalyst system for the (co)polymerization of olefins, comprising (A) a solid catalyst component comprising Ti, Mg, halogen, (B) an aluminum alkyl compound and (C) an halogenated cyclic ether having at least three carbon atoms in the ring. In some embodiments, the present disclosure utilizes halogenated cyclic ethers as catalyst modifiers to increase catalyst activity without adversely impacting the polymer properties.

DETAILED DESCRIPTION OF THE INVENTION

In some embodiments, the halogenated cyclic ether used in the catalyst systems has at least four carbon atoms, and the ethers contain two or more halogen atoms.

In further embodiments, the halogenated cyclic ether can be either a monoether or polyether, such as a halogenated cyclic monoether.

In certain embodiments, one or more of the hydrogen atoms of the ether ring can be substituted with one or more hydrocarbon groups having from 1 to 20 carbon atoms, such as alkyl groups having from 1 to 10 carbon atoms, including from 1 to 5 carbon atoms. In one embodiment, only one hydrogen atom is substituted with an alkyl group.

Halogens such as Cl, Br and F may be used in the catalyst systems of the present disclosure. The halogen atoms can either be in the ether ring or used to replace a hydrogen atom of the hydorocarbon substituent attached to the ether ring.

Cyclic ethers may be selected 2-chloro-tetrahydrofurane, 3-chloro-tetrahydrofuran, 2,3-dichloro-tetrahydrofuran, 2,5-dichloro-tetrahydrofuran, 3,3-dichloro-tetrahydrofuran, 3,4-dichloro-tetrahydrofuran, 2,3,3-trichloro-tetrahydrofuran, 2,3,5-trichloro-tetrahydrofuran, 2,3,4,5-tetrachloro-tetrahydrofuran, 2,3,5,5-tetrachloro-tetrahydrofuran, 2,3,3,5-tetrachloro-tetrahydrofuran, 2,2,3,4,5-pentachloro-tetrahydrofuran, 2,2,3,5,5-pentachloro-tetrahydrofuran, 2,3,3,5,5-pentachloro-tetrahydrofuran, 2,2,3,4,5,5-hexachloro-tetrahydrofuran, 2,2,3,3,5,5-hexachloro-tetrahydrofuran, 2-chloromethyl-tetrahydrofuran, 3-chloromethyl-tetrahydrofuran, 3-bromomethyl-tetrahydrofuran, 2-ethyl-3-chloromethyl-tetrahydrofuran, 2-chloro-tetrahydropyran, 3-chloro-tetrahydropyran, 4-chloro-tetrahydropyran, 2,3-dichloro-tetrahydropyran, 2,3,3-trichloro-tetrahydropyran, 2-methyl-3-chloro-tetrahydropyran, 2-methyl-3-chloro-tetrahydropyrane, 2-ethyl-3-chloro-tetrahydropyran, 2-propyl-3-chloro-tetrahydropyran, 2-butyl-3 -chloro-tetrahydropyran, 2-methyl-3 -chloro-tetrahydrofuran, 2-ethyl-3-chloro-tetrahydrofuran, 2-propyl-3-chloro-tetrahydrofuran, 2-isopropyl-3-chloro-tetrahydrofuran, 2-butyl-3-chloro-tetrahydrofuran, 2-pentyl-3-chloro-tetrahydrofuran, 2,3-dibromo-tetrahydropyran, 2-methyl-3-dibromo-tetrahydropyran, 2-ethyl-3-dibromo-tetrahydropyran, 2-propyl-3-dibromo-tetrahydropyran, 2-butyl-3-dibromo-tetrahydropyran, 2-pentyl-3-dibromo-tetrahydropyran, 2,3-dibromo-tetrahydrofuran, 2-methyl-3-dibromo-tetrahydrofuran, 2-ethyl-3-dibromo-tetrahydrofuran, 2-propyl-3-dibromo-tetrahydrofuran, 2-butyl-3-dibromo-tetrahydrofuran, 2-pentyl-3-dibromo-tetrahydrofuran, 2-methoxy-3-chloro-tetrahydropyran, 2-methoxy-3-bromo-tetrahydropyran, 2-chloro-1,4-dioxane and 2,3 -dichloro-1,4-dioxane.

The halogenated ether compound (C) is used in amounts to give a molar ratio (C)/Ti (where Ti is the titanium molar amount within component (A)), ranging from 0.1 to 50, such as from 1 to 25 and from 1 to 10.

In one embodiment, the catalyst component of the present disclosure comprises a Ti compound having at least one Ti-halogen bond supported on a magnesium chloride such as magnesium dichloride in active or inactive form. In the context of the present application, the term "magnesium chloride" means magnesium compounds having at least one magnesium chloride bond. The catalyst component may also contain groups different from halogen in amounts lower than 0.5 mole for each mole of titanium, such as lower than 0.3.

In the catalyst component of the present disclosure, the average pore radius value, for porosity due to pores up to 1 μm, is in the range from 600 to 1200 Å.

In some embodiments, the particles of the solid component have substantially spherical morphology and average diameter comprised between 5 and 150 μm, such as from 20 to 100 μm and from 30 to 90 μm. "Particles having substantially spherical morphology" refers to particles where the ratio between the greater axis and the smaller axis is equal to or lower than 1.5, such as lower than 1.3.

The magnesium dichloride in the active form is characterized by X-ray spectra in which the most intense diffraction line which appears in the spectrum of the non-active chloride (lattice distanced of 2.56 Å) is diminished in intensity and is broadened to such an extent that it becomes totally or partially merged with the reflection line falling at lattice distance (d) of 2.95 Å. When the merger is complete the single broad peak generated has the maximum of intensity which is shifted towards angles lower than those of the most intense line.

In some embodiments, titanium compounds have the formula $Ti(OR^{II})_nX_{y-n}$, wherein n is a number comprised between 0 and 0.5 inclusive, y is the valence of titanium, $R^{II}$ is an alkyl, cycloalkyl or aryl radical having 1-8 carbon atoms and X is halogen are used. In certain embodiments, $R^{II}$ can be ethyl, isopropyl, n-butyl, isobutyl, 2-ethylhexyl, n-octyl and phenyl, (benzyl); and X is chlorine.

In additional embodiments, where y is 4, n varies from 0 to 0.02; and where y is 3, n varies from 0 to 0.015, for instance $TiCl_4$.

The solid components of the present disclosure may comprise an electron donor compound (internal donor) selected from ethers, esters, amines and ketones. In some embodiments, the electron donor compound may be used in amount to give ED/Ti ratios from 0.1 to 6, including from 0.5 to 5.

In further embodiments, electron donor compounds are selected from esters of aliphatic or aromatic carboxylic acids such as phthalates, acetates, including ethylacetate, benzoates and alkoxybenzenes as described in WIPO Pat. App. Pub. No. WO 2011/015553, cyclic alkyl ethers such as tetrahydrofuran and diethers.

In addition to the above mentioned embodiments, the non-stereospecific solid catalyst component (a) may comprise a porosity PF determined with the mercury method ranging from 0.2 to 0.80 cm³/g, including from 0.3 to 0.70 cm³/g and from 0.35-0.60 cm³/g.

In some embodiments, the surface area measured by the BET method is lower than 80, such as between 10 and 70 m²/g. The porosity measured by the BET method is generally comprised between 0.10 and 0.50, including from 0.10 to 0.40 cm³/g.

The particles of solid component have substantially spherical morphology and average diameter comprised between 5 and 150 μm, such as from 20 to 100 μm and from 30 to 80 μm. "Particles having substantially spherical morphology" refers to particles where the ratio between the greater axis and the smaller axis is equal to or lower than 1.5, including lower than 1.3.

In some embodiments, the method for the preparation of spherical components mentioned above comprises a step (a) in which a compound $MgCl_2 \cdot mR^{III}OH$, wherein 0.3≤m≤1.7 and $R^{III}$ is an alkyl, cycloalkyl or aryl radical having 1-12 carbon atoms, is reacted with the titanium compound of the formula $Ti(OR^I)_nX_{4-n}$, in which n, y, X and $R^I$ have the same meaning defined above.

In some embodiments, $MgCl_2 \cdot mR^{III}OH$ represents a precursor of a Mg-dihalide. These compounds may generally be obtained by mixing alcohol and magnesium chloride in the presence of an inert hydrocarbon immiscible with the adduct under stirring conditions at the melting temperature of the adduct (100-130° C.). The emulsion may then be quickly quenched, causing the solidification of the adduct in the form of spherical particles. Methods for the preparation of these spherical adducts are reported, for example, in U.S. Pat. Nos. 4,469,648 and 4,399,054, and WIPO Pat. App. Pub. No. WO98/44009. Another method for spherulization in accordance with some embodiments of the present disclosure is tspray cooling as described, for example, in U.S. Pat. Nos. 5,100,849 and 4,829,034. Adducts having the desired final alcohol content can be obtained by directly using the desired amount of alcohol during the adduct preparation. However, if adducts with increased porosity are to be obtained it may be convenient to first prepare adducts with more than, e.g. 1.7 moles of alcohol per mole of $MgCl_2$ and then subject them to a thermal and/or chemical dealcoholation process. In certain embodiments, the thermal dealcoholation process is carried out in a nitrogen flow at temperatures between 50 and 150° C. until the alcohol content is reduced to a value ranging from 0.3 to 1.7. A process of this type is described in EP Pat. No. 395083.

In additional embodiments, the dealcoholated adducts of the present disclosure are characterized by a porosity (measured by mercury method due to pores with radii up to 0.1 μm ranging from 0.15 to 2.5 cm³/g, such as from 0.25 to 1.5 cm³/g.

In the reaction of step (a) the molar ratio Ti/Mg is stoichiometric or higher, including a ratio higher than 3. In some embodiments, a large excess of titanium compound is used. Ttitanium compounds for use in the present disclosure are titanium tetrahalides such as $TiCl_4$. The reaction with the Ti compound can be carried out by suspending the adduct in cold $TiCl_4$ (generally around 0° C.). The mixture is heated up to 80-140° C. and kept at this temperature for 0.5-8 hours, such as from 0.5 to 3 hours. The excess of titanium compound can be separated at high temperatures by filtration or sedimentation and siphoning. in certain embodiments, step (a) can be repeated two or more times. In cases of catalysts containing an electron donor compound, the electron donor compound can be added together with the titanium compound in the reaction system for reaction with the $MgCl_2 \cdot mR^{III}OH$ adduct.

In some embodiments, the electron donor compound is separately added in a further step after the completion of the reaction between the adduct and the titanium compound as described in WIPO Pat. WO2004/106388.

In some embodiments, the catalyst component (B) of the present disclosure is selected from Al-alkyl compounds that may or may not be halogenatedincluding Al-trialkyl compounds, for example Al-trimethyl, Al-triethyl , Al-tri-n-butyl and Al-triisobutyl compounds. In further embodiments, the Al/Ti ratio is higher than 1, such as between 5 and 800.

In additional embodiments, components (A)-(C) can be fed separately into the reactor where the polymerization conditions can exploit their catalytic activity. In some embodiments, a "pre-contact" step may be carried out with the components, optionally in the presence of small amounts of olefins, for a period of time ranging from 0.1 to 120 minutes, such as from 1 to 60 minutes. The pre-contact step can be carried out in a liquid diluent at a temperature ranging from 0 to 90° C., including from 20 to 70° C.

The catalyst system can be used directly in the main polymerization process or alternatively, it can be pre-polymerized beforehand. A pre-polymerization step may be utilized when the main polymerization process is carried out in the gas phase. The pre-polymerization can be carried out with any of the olefins $CH_2=CHR$, where R is H or a $C_1$-$C_{10}$ hydrocarbon group. In some embodiments, a pre-polymerization step may comprise ethylene, propylene or mixtures thereof, with one or more a-olefins, wherein the mixtures may contain up to 20% in moles of $\alpha$-olefin, forming amounts of polymer from about 0.1 g per gram of solid component up to about 1000 g per gram of solid catalyst component. In further embodiments, the pre-polymerization step can be carried out at temperatures from 0 to 80° C., including from 5 to 70° C., in the liquid or gas phase. The pre-polymerization step can be performed in-line as a part of a continuous polymerization process or separately in a batch process. Batch pre-polymerization of the catalyst of the disclosure may be performed with ethylene in order to produce an amount of polymer ranging from 0.5 to 20 g per gram of catalyst component. The pre-polymerized catalyst component can, in certain embodiments, also be subject to a further treatment with a titanium compound before being used in the main polymerization step. In this case, $TiCl_4$ may be used. In certain embodiments, the reaction with the Ti compound can be carried out by suspending the pre-polymerized catalyst component in the liquid Ti compound optionally in mixture with a liquid diluent; wherein the mixture is heated to 60-120° C. and kept at this temperature for 0.5-2 hours.

The catalysts of the present disclosure can be used in any kind of polymerization process both in liquid and gas-phase processes. For instance, catalysts having small particle sizes (for example, less than 40 μm) may be used for slurry polymerization in an inert medium, which can be carried out continuously stirred tank reactor or in loop reactors. Additionally, catalysts having larger particle sizes may be used for gas-phase polymerization processes which can be carried out in agitated or fluidized bed gas-phase reactors.

The catalysts of the present disclosure advantageously show a high polymerization activity in the (co)polymerization of ethylene.

In addition to the ethylene homopolymers and copolymers mentioned above, the catalysts of the present disclosure are suitable for preparing very-low-density and ultra-low-density polyethylenes (VLDPE and ULDPE, having a density lower than 0.920 g/cm³, such as between 0.920 and 0.880 g/cm³) consisting of copolymers of ethylene with one or more alpha-olefins having from 3 to 12 carbon atoms, having a mole content of units derived from ethylene of higher than 80%; and elastomeric copolymers of ethylene and propylene and elastomeric terpolymers of ethylene and propylene with smaller proportions of a diene having a content by weight of units derived from ethylene of between about 30 and 70%.

The following examples are given in order to further describe the present disclosure in a non-limiting manner.

EXAMPLES

Characterization

The properties are determined according to the following methods:

MIE flow index: ASTM-D 1238 condition E
MIF flow index: ASTM-D 1238 condition F
MIP flow index: ASTM D 1238 condition P
Bulk density: DIN-53194

General Procedure for the HDPE Polymerization Test
Ethylene Polymerization in Iso-hexane Solvent A 4.5-liter stainless-steel autoclave equipped with a magnetic stirrer, temperature and pressure indicator, feeding line for iso-hexane, ethylene, and hydrogen, was used and purified via pure nitrogen at 70° C. for 60 minutes. Then, a solution of 1550 cm³ of iso-hexane containing 5.00 cm³ of 8% wt/vol TEAL/iso-hexane was introduced at a temperature of 30° C. under nitrogen flow. In a separate 200 cm³ round bottom glass bottle, 50 cm³ of anhydrous iso-hexane, 1.25 cm³ of 8% wt/vol TEAL/iso-hexane solution, and 0.020-0.030 grams of the solid catalyst as prepared in Example 1 and the amount of promoter reported in Table 1 were introduced. The components were mixed together, aged 10 minutes at room temperature and introduced under nitrogen flow into the reactor. The autoclave was closed, then the temperature was raised to 85° C., and hydrogen (3 bars partial pressure) and ethylene (7.0 bars partial pressure) were added.

Under continuous stirring, the total pressure was maintained at 85° C. for 120 minutes by feeding ethylene. The reactor was then depressurized and the temperature was reduced to 30° C.

The recovered polymer was dried at 40 ° C. under vacuum and analyzed. The results are reported in Table 1.

Examples 1-7 and Comparison Example 1

Preparation of the Solid Component (A)

A magnesium chloride and alcohol adduct containing about 3 mols of alcohol was prepared following the method described in Example 2 of U.S. Pat. No. 4,399,054, but working at 2000 RPM instead of 10000 RPM. The adduct was subjected to a thermal treatment, under nitrogen stream, over a temperature range of 50-150° C. until a weight content of 24.4% of alcohol was reached.

Into a 2 L four-necked round flask, purged with nitrogen, 1 L of $TiCl_4$ was introduced at 0° C. At the same temperature, 70 g of a spherical $MgCl_2$/EtOH adduct containing 24.4% wt of ethanol and prepared as described above were added under stirring. The temperature was raised to 130° C. over a 2 h period and maintained for 30 min. The stirring was discontinued, the solid product was allowed to settle and the supernatant liquid was siphoned off. A new amount of fresh $TiCl_4$ was added to the flask to reach the initial liquid volume. The temperature was maintained at 115° C. for 15 minutes. The solid was again allowed to settle, and the liquid was siphoned off. The solid was then washed three times with anhydrous iso-hexane (400 mL at each washing) at 60° C., and twice at 40° C.

The residual solid was then suspended in 600 mL of dry iso-hexane. At the same temperature, under stirring, 92 ml of ethylacetate were added dropwise.

The temperature was raised to 50° C. and the mixture was stirred for 2 hours. The stirring was discontinued, the solid product was allowed to settle and the supernatant liquid was siphoned off.

The solid was washed twice with anhydrous hexane (2×100 mL) at 40° C., recovered, dried under vacuum and analyzed.

Mg=15.0% wt, Ti=2.4 wt %, AcOEt=26.9% wt

The solid catalyst component (A) was employed in the ethylene polymerization according to the general procedure using the type and amount of promoter compound (C) reported in Table 1, together with the polymerization results.

TABLE 1

| EX. | Comp. C | AlR$_3$/C (mol ratio) | C/Ti (mol Ratio) | Activity (kg/g) | MIE (dg/min) | MIF/MIE | B.D. Poured (g/cm$^3$) |
|---|---|---|---|---|---|---|---|
| Comp. 1 | THF | 70 | 4.8 | 7.6 | 01.90 | 28.9 | 0.320 |
| 1 | 2,3Cl$_2$—THF | 247 | 1.5 | 13.7 | 1.07 | 30.4 | 0.355 |
| 2 | 2,3Cl$_2$—THF | 88 | 4.1 | 17.0 | 0.95 | 30.4 | 0.296 |
| 3 | 2,3Cl$_2$—THF | 41 | 8.7 | 17.8 | 0.92 | 29.9 | 0.310 |
| 4 | 2,3Cl$_2$—THP | 88 | 4.2 | 13.2 | 0.60 | 29.3 | 0.344 |
| 5 | 2,3Cl$_2$—THP | 44 | 8.2 | 15.7 | | | 0.312 |
| 6 | 2(ClMe)THF | 75 | 4.6 | 12.8 | 1.44 | 28.5 | 0.413 |
| 7 | 2(ClMe)THF | 53 | 6.9 | 13.1 | 0.77 | 26.9 | 0.331 |
| Comp. 2 | — | — | — | 11.6 | 1.05 | 32.0 | 0.261 |

THF = tetrahydrofuran
2,3Cl$_2$—THF = 2,3-dichloro-tetrahydrofuran
2,3Cl$_2$—THP = 2,3-dichloro-tetrahydropyran
2(ClMe)THF = 2-chloromethyl-tetrahydrofuran

What is claimed is:

1. A catalyst system for the (co)polymerization of ethylene, comprising (A) a solid catalyst component comprising Ti, Mg, and a halogen, (B) an aluminum alkyl compound, and (C) a halogenated cyclic ether selected from the group consisting of 2-chloro-tetrahydrofuran, 3-chloro-tetrahydrofuran, 2,3-dichloro-tetrahydrofuran and 2,3-dichloro-tetrahydropyran, wherein the catalyst system has a molar ratio of component (C)/Ti ranging from 1 to 25, and wherein the molar amount of Ti is based on the amount of Ti present in component (A).

2. The catalyst system of claim 1, wherein the solid catalyst component comprises an internal electron donor.

3. The catalyst system of claim 2, wherein the internal electron donor is selected from the group consisting of ethers, esters, amines and ketones.

4. The catalyst system of claim 1, wherein the halogen of component (A) is Cl.

5. A process for the preparation of an olefin (co)polymer, carried out by polymerizing olefins in the presence of a catalyst system comprising (A) a solid catalyst component comprising Ti, Mg, and a halogen, (B) an aluminum alkyl compound, and (C) a halogenated cyclic ether selected from the group consisting of 2-chloro-tetrahydrofuran, 3-chloro-tetrahydrofuran, 2,3-dichloro-tetrahydrofuran and 2,3-dichloro-tetrahydropyran, wherein the catalyst system has a molar ratio of component (C)/Ti ranging from 1 to 25, and wherein the molar amount of Ti is based on the amount of Ti present in component (A).

* * * * *